Figure 1:
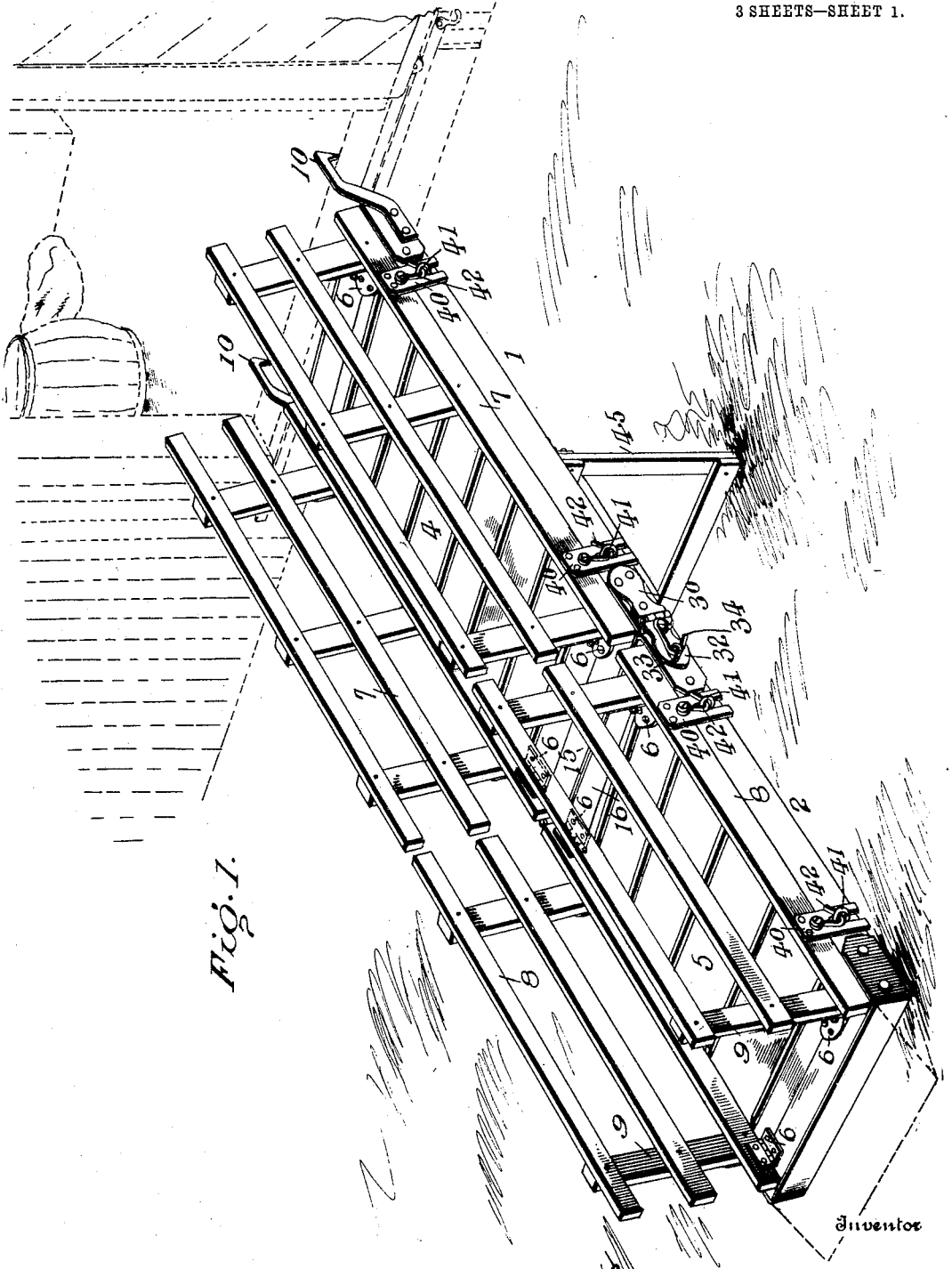

No. 788,424. PATENTED APR. 25, 1905.
C. P. OCHS.
DEVICE FOR LOADING OR UNLOADING CATTLE.
APPLICATION FILED DEC. 1, 1904.

3 SHEETS—SHEET 1.

Witnesses
Jno. Imirie
M. R. Tanner

Inventor
Christian P. Ochs
By Robertson and Johnson
Attorneys

No. 788,424. PATENTED APR. 25, 1905.
C. P. OCHS.
DEVICE FOR LOADING OR UNLOADING CATTLE.
APPLICATION FILED DEC. 1, 1904.
3 SHEETS—SHEET 2.
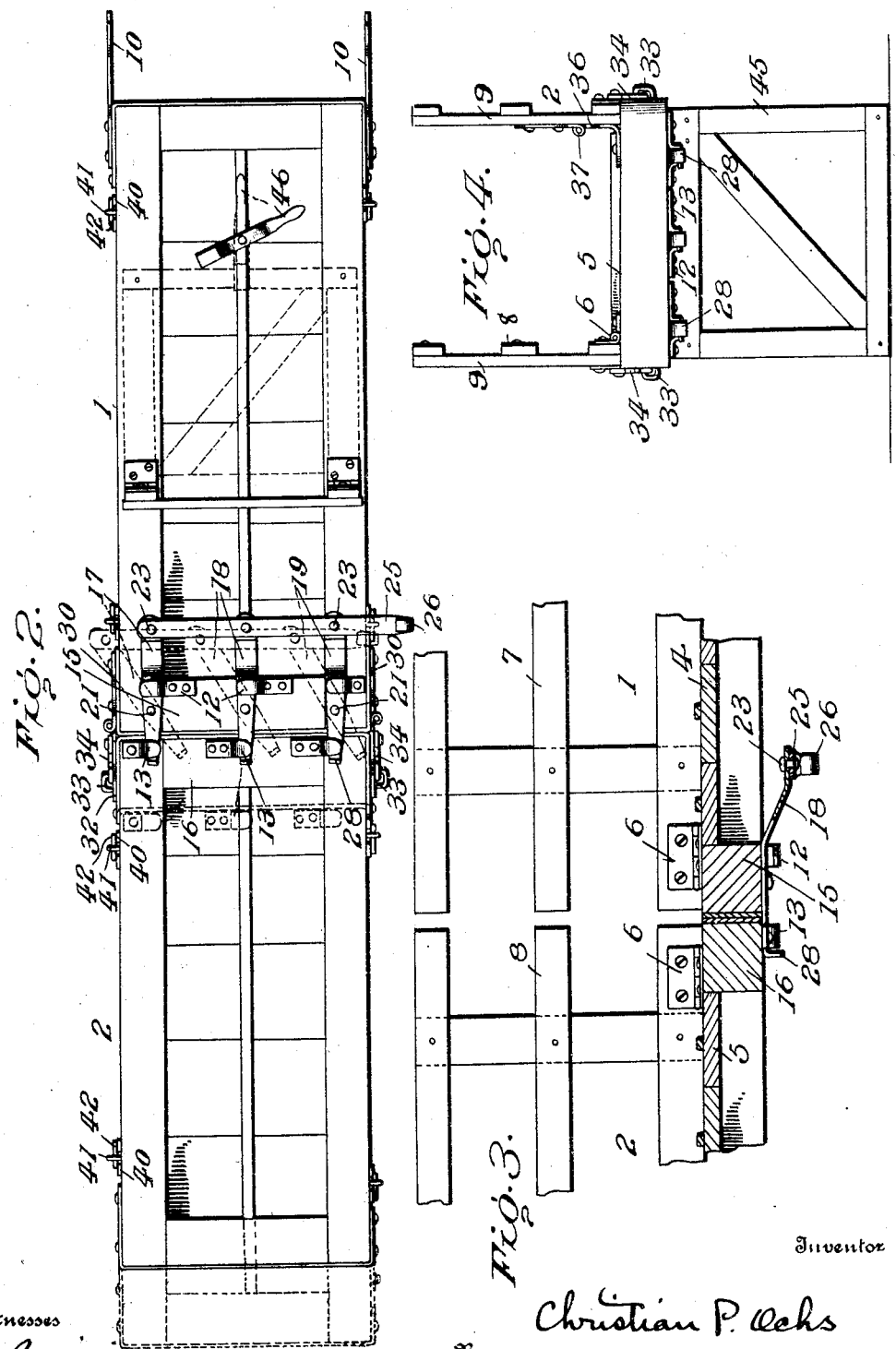

No. 788,424. PATENTED APR. 25, 1905.
C. P. OCHS.
DEVICE FOR LOADING OR UNLOADING CATTLE.
APPLICATION FILED DEC. 1, 1904.
3 SHEETS—SHEET 3.
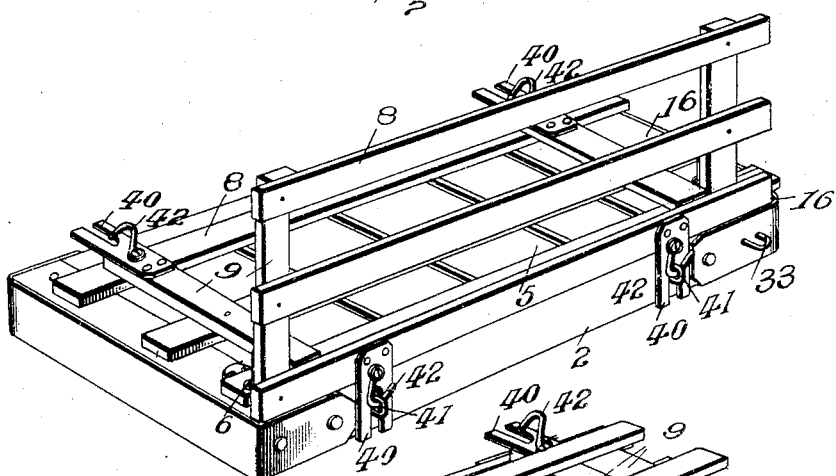
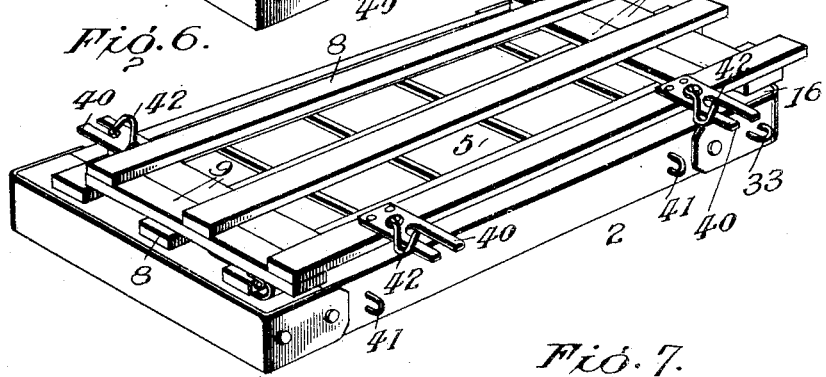
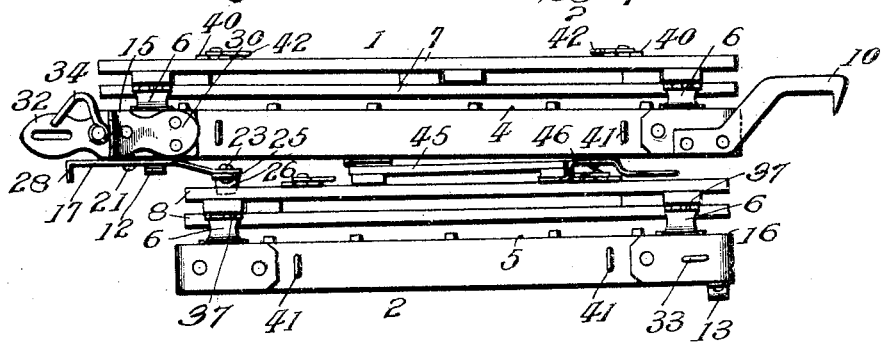
Witnesses
Jno Imirie
M. R. Tanner
Inventor
Christian P. Ochs
By
Robertson and Johnson
Attorneys No. 788,424.

Patented April 25, 1905.

UNITED STATES PATENT OFFICE.

CHRISTIAN P. OCHS, OF HARRISBURG, PENNSYLVANIA.

DEVICE FOR LOADING OR UNLOADING CATTLE.

SPECIFICATION forming part of Letters Patent No. 788,424, dated April 25, 1905.

Application filed December 1, 1904. Serial No. 235,120.

*To all whom it may concern:*

Be it known that I, CHRISTIAN PHILIP OCHS, a citizen of the United States of America, and a resident of Harrisburg, in the county of Dauphin, State of Pennsylvania, have invented certain new and useful Improvements in Devices for Loading or Unloading Cattle, of which the following is a specification.

This invention relates to certain new and useful improvements in devices for loading and unloading horses and other cattle; and the object of my invention is to devise a device of this character which will be capable of being collapsed or folded in order that it may be shipped in a railway-car.

Owing to the difficulty of unloading horses at intermediate points the transportation of cattle is necessarily expensive; but with a "knocked-down" gangway, especially if made in sections, it is possible to transport the gangway in the car with the horse or horses, so that the unloading will be facilitated. In actual practice I find that with a gangway made as illustrated in the accompanying drawings the whole device can be put together, attached to the car, the horse unloaded, and the device again knocked down in less than five minutes. This invention will therefore make it possible for transportation companies to ship horses and other cattle to intermediate points, or, in fact, from one station to another without giving up the use of a whole car for this purpose.

With the aforesaid object in view my invention therefore consists in the device for loading and unloading cattle, as illustrated, in the form which I now think preferable, in the accompanying drawings and as will be hereinafter described in detail, and then definitely set forth by the claims at the end hereof.

In the accompanying drawings, which represent the preferable, though not necessary, embodiment of my invention, Figure 1 is a perspective view of my gangway in position for use. Fig. 2 is a bottom plan view of the same, showing the sections locked together in full lines and unlocked and detached in dotted lines. Fig. 3 is a sectional detail. Fig.
4 is an end elevation. Fig. 5 is a perspective view of one of the sections having one of its sides folded and the other upright. Fig. 6 is a similar view of one of the sections having both of its sides folded. Fig. 7 is a perspective view of both of the sections folded, one being locked over the other.

Referring to the details of the drawings by numerals, 1 and 2 designate two separate sections of my gangway, which are constructed in such a manner that they may be connected together, as illustrated in Figs. 1 and 2. Each of the main sections 1 and 2 comprises a floor 4 and 5, to which are connected sides 7 and 8, preferably hinged to the floor portions, as indicated at 6. One of the sections is provided at one end with hooks 10, especially shaped so that they may be hooked onto the sill or onto the bottom edge or wall of the door-opening of a car, although it is manifest that these hooks may be of different shape or be dispensed with altogether.

Where the two sections 1 and 2 come together, I provide a locking and strengthening device which is preferably located on the bottom of said sections, and therefore entirely out of the way. This device consists of two sets of hooks 12 and 13, connected to the end sills 15 and 16 and facing or opening in opposite directions. To coact with these hooks 12 and 13, I employ locking and strengthening levers 17, 18, and 19, which are pivoted to the end sill of one section and project beyond the same sufficiently to be in the path of the hooks on the opposite end sill. These levers are pivoted at 21 to the end sill and also at 23 to an operating-lever 25, which latter has one end formed into a handle 26, by which the lever may be operated. From this construction it will be seen that when the two sections are brought properly together an operator merely has to move the handle 26 of the lever 25, when all three of the levers 17, 18, and 19 are moved under the hooks 12 and 13, and the sections 1 and 2 are thereby connected together, as shown in full lines in Fig. 95 2, and when it is desired to detach the sections the levers are moved in the positions shown in dotted lines in the same figure, when the sections may be separated, as shown in dotted lines. The locking-levers 17, 18, and 19 each have turned-down ends 28 to prevent the levers from slipping out of the hooks 13. It will be evident that the hooks 12 may be omitted, if desired; but I prefer to employ them, and thereby lessen the load carried by the pivots 21 of the locking and strengthening levers. In addition to the said levers 17, 18, and 19, which operate on the bottom of the gangway, I also employ side locks, which, as shown, consist of hinged hasp-locks, the fixed leaf 30 of which is connected to the section 1 and the hinged leaf 32 arranged to swing over a staple 33, projecting from the side sill of section 2, said hinged leaf having the ordinary pivoted hook 34 to project into the staple 33 and lock the two sections together. Of course one of these hasps is located on each side of the gangway.

When it is desired to ship the gangway in a car, it is of course necessary to disconnect the hasp-locks and release the locking-levers on the bottom of the car, when the two sections of the gangway will be short enough to be easily manipulated and conveniently stowed in one end of the car; but in order to make the sections of the gangway occupy as small an amount of space as possible I make each of the sections of the knocked-down character. From an inspection of my drawings it will be seen that the sides 7 and 8 are each hinged to the floor, so that each side may be folded over onto the floor, as indicated in Fig. 6. It will also be observed that one of the sides is so proportioned as to be swung down within the hinge of the other side, and one set of hinges is arranged so that the hinge-point 37 (see Fig. 7) is at quite a distance above the floor of the car, so that this side will fold down on top of the side first mentioned. It will also be observed that the standards 9 of the one side are out of line with the standards 9 of the other side, so that when folded the standards fold alongside of each other, as shown in Fig. 6.

In order to lock the sides in their proper positions, I provide each one of them with a hasp 40, which is connected to the bottom rail of the pivoted sides, and these hasps are intended to coact with staples 41, projecting from the longitudinal sills of the floor, so that when the sides are brought to their operative positions the hooks 42 of the hasps may be in such a position as to be swung into the staples, and thus lock the sides at right angles to the floor of the sections. The sides are thus locked directly to the floor, thus avoiding the necessity of other additional parts.

It is sometimes necessary to unload horses from cars having depressed tracks, and when this is necessary the main section No. 1 may be used without coupling onto it the section No. 2, and, on the other hand, section No. 2 is especially arranged for unloading a horse from one car to another when the cars are "matched." Whenever this is necessary, section No. 2 is used to bridge across from one car-door to the other.

Connected to the bottom of section No. 1 is a hinged support 45, which normally folds under the gangway and is secured by a locking-lever 46. Whenever it becomes necessary to use the gangway, the attendants first attach section No. 1 to the car, and in order to have it in the proper position, so as to easily couple section No. 2 onto it, this support 45 is let down to temporarily support the free end of section No. 1. It will then be an easy matter to couple section No. 2 onto the first section, so as to make it possible for two attendants to attend to the whole matter. If desired, the support 45 may be used to entirely support the gangway.

From the foregoing and the accompanying drawings it will be seen that I have invented a gangway comprising separable knockdown sections, which may be used as one gangway in the many places where it is necessary to use a relatively long one, and that each of the sections may be used when separated as a complete gangway, one of the sections having special means for supporting it in an inclined position and the other section, or, in fact, both sections, being adapted to be used to bridge across from one car to another. Thus when the sections are detached horses may be loaded or unloaded from both sides of a car at once. It will also be seen that where the two sections are locked together one of the locking means serves the additional purpose of strengthening the sections, so that they are, in effect, one rigid structure. In practice the locking and strengthening levers 17, 18, and 19 are made strong enough to support the entire load at the point where the sections come together, while the main function of the hasp-locks at the side is to keep the sections in proper alinement.

I am aware that I am not the first to invent a gangway for use in connection with railway-cars, and hence do not claim such broadly; nevertheless it is manifest that changes and modifications may be made without departing from my invention, the scope of which is set forth by the appended claims.

What I claim as new is—

1. A gangway having sides hinged thereto, the pivots of the hinges of one side being near to the floor of the gangway and the pivots of the hinges of the other side being above the pivots of the first-named hinges, thus permitting the latter side to fold over the other.

2. In a knockdown gangway, in combination, a floor or tread portion, sides hinged thereto, and hasps for locking the same in upright position, said sides arranged to fold flat one over the other when the gangway is collapsed.

3. In a gangway, in combination, a floor or tread portion having sides hinged thereto, and hasps or catches for locking the sides in upright position, the pivots of the hinges of one side being near to the floor of the gangway and the pivots of the hinges of the other side being above the floor and thereby permitting the latter side to fold over the former.

4. In a gangway, a floor, sides hinged to said floor and provided with uprights, each upright being out of line with the corresponding upright of the opposite side and the hinges being located to permit the sides to fold flat one upon the other.

5. A gangway comprising a plurality of knockdown sections, and releasable means for retaining the same in coöperative relation.

6. In a gangway, a plurality of tread-sections, coöperating means at the abutting ends of adjacent sections locking the same firmly together as a unitary structure whereby said tread-sections are in the same plane or alinement.

7. In a gangway, a plurality of separable tread-sections, means for fastening together adjacent sections, and additional means for uniting said sections firmly.

8. In a gangway having a plurality of separable tread-sections, connecting-bars on one section, and holding means on the adjacent section coöperating therewith and locking the sections into a substantially rigid gangway whereby said tread-sections are in the same plane or alinement.

9. In a gangway having a plurality of separable tread-sections, simultaneously-operable connecting-bars and holding means on the adjacent section coöperating therewith.

10. In a gangway having a plurality of separable tread-sections, means for fastening together adjacent sections, and additional coöperating strengthening means disposed in part on each of two adjacent sections.

11. In a gangway having a plurality of separable tread-sections, bars pivoted near the end of one section, holding means on the other section coöperating therewith, and a bar connected to each of said bars to operate them simultaneously.

12. A gangway comprising separable knockdown tread-sections, one of said sections having means, when one end is in place, to support the other end in elevated position to permit the ready attachment to it of the adjacent section.

13. A gangway comprising a plurality of knockdown tread-sections, one of said sections being provided at one end with grappling means and having means to hold the other end elevated to permit the ready coupling to it of the adjacent section.

14. A gangway comprising separable knockdown sections, said sections when united constituting a single continuous gangway, and each of said sections when detached constituting in itself a complete gangway.

15. A gangway comprising separable knockdown sections, said sections when united constituting a single continuous gangway, and each of said sections when detached constituting in itself a complete gangway, one of said sections having special means for holding it in position for use.

16. A gangway comprising separable knockdown sections, said sections when united constituting a single continuous gangway, and each of said sections when detached constituting in itself a complete gangway, one of said sections having means for holding its end in position and means intermediate of its ends forming an additional support.

Signed by me at Washington, District of Columbia, this 26th day of November, 1904.

CHRISTIAN P. OCHS.

Witnesses:
ARTHUR E. DOWELL,
BENJ. R. JOHNSON.